(12) United States Patent
Johnson et al.

(10) Patent No.: US 9,211,858 B2
(45) Date of Patent: Dec. 15, 2015

(54) BEAM WITH VARIED BENDING MOMENT, APPARATUS, AND METHOD

(71) Applicant: Shape Corp., Grand Haven, MI (US)

(72) Inventors: Thomas J. Johnson, Spring Lake, MI (US); Brian E. Malkowski, Allendale, MI (US); Brian P. Oxley, Ada, MI (US)

(73) Assignee: SHAPE CORP., Grand Haven, MI (US)

( * ) Notice: Subject to any disclaimer, the term of this patent is extended or adjusted under 35 U.S.C. 154(b) by 0 days.

(21) Appl. No.: 14/317,962

(22) Filed: Jun. 27, 2014

(65) Prior Publication Data
US 2015/0102613 A1   Apr. 16, 2015

Related U.S. Application Data

(60) Provisional application No. 61/889,750, filed on Oct. 11, 2013.

(51) Int. Cl.
| | |
|---|---|
| B60J 7/00 | (2006.01) |
| B60R 19/18 | (2006.01) |
| B21D 53/88 | (2006.01) |
| B21D 5/08 | (2006.01) |
| B21D 47/01 | (2006.01) |

(52) U.S. Cl.
CPC .............. B60R 19/18 (2013.01); B21D 53/88 (2013.01); *B21D 5/086* (2013.01); *B21D 47/01* (2013.01); *B60R 2019/1813* (2013.01)

(58) Field of Classification Search
CPC .......... B60R 19/18; B60R 2019/1826; G01R 1/07342; G01R 3/00; G02B 27/0994; H01L 2224/48247; H01L 2224/32245; H01L 2224/48091; H01L 2224/4826; H01L 2224/73265

USPC ................................. 296/187.09; 293/102
See application file for complete search history.

(56) References Cited

U.S. PATENT DOCUMENTS

| | | | | |
|---|---|---|---|---|
| 1,611,156 | A | * | 12/1926 | Borresen ................. 293/124 |
| 1,663,424 | A | * | 3/1928 | Huston ................... 293/102 |
| 4,116,480 | A | * | 9/1978 | Crestetto ................ 293/102 |
| 4,117,702 | A | * | 10/1978 | Foster ..................... 72/7.4 |

(Continued)

FOREIGN PATENT DOCUMENTS

| | | |
|---|---|---|
| DE | 102011052153 A1 | 1/2013 |
| DE | 102011121379 A1 | 6/2013 |
| RU | 2405690 C1 | 12/2010 |

OTHER PUBLICATIONS

International Search Report and the Written Opinion of the International Searching Authority, or the Declaration; International Appln. No. PCT/US 2014/045236; Date: Oct. 16, 2014; pp. 1-7.

*Primary Examiner* — Kiran B Patel
(74) *Attorney, Agent, or Firm* — Gardner, Linn, Burkhart & Flory, LLP

(57) ABSTRACT

A structural beam includes a reinforcement beam having a length and mounts at ends of the beam and cross sectional shapes at various locations along the length, including a first cross sectional shape near ends of the beam providing a first bending moment and a second cross sectional shape at a center of the beam providing a second bending moment different than the first bending moment, and further including intermediate cross sectional shapes between the ends and center having intermediate bending moments between the first and second bending moments. The cross sections may define open C-shapes or may include a tubular shape.

20 Claims, 11 Drawing Sheets

(56) References Cited

U.S. PATENT DOCUMENTS

| | | | | |
|---|---|---|---|---|
| 4,563,028 A * | | 1/1986 | Ogawa et al. | 293/122 |
| 4,599,843 A * | | 7/1986 | Ingvarsson | 296/146.6 |
| 4,838,606 A * | | 6/1989 | Furubayashi et al. | 296/187.12 |
| 4,961,603 A * | | 10/1990 | Carpenter | 293/102 |
| 5,080,410 A * | | 1/1992 | Stewart et al. | 293/102 |
| 5,092,512 A * | | 3/1992 | Sturrus et al. | 228/146 |
| 5,104,026 A * | | 4/1992 | Sturrus et al. | 228/17.5 |
| 5,306,058 A * | | 4/1994 | Sturrus et al. | 293/154 |
| 5,454,504 A | | 10/1995 | Sturrus | |
| 5,577,796 A * | | 11/1996 | Clausen | 296/202 |
| 5,600,931 A * | | 2/1997 | Jonsson | 52/833 |
| 5,603,541 A * | | 2/1997 | Wada et al. | 293/102 |
| 5,756,167 A * | | 5/1998 | Tamura et al. | 428/31 |
| 5,785,376 A * | | 7/1998 | Nees et al. | 296/146.6 |
| 5,887,938 A * | | 3/1999 | Topker et al. | 296/187.12 |
| 5,934,544 A * | | 8/1999 | Lee et al. | 228/146 |
| 6,042,163 A * | | 3/2000 | Reiffer | 293/155 |
| 6,240,820 B1 | | 6/2001 | Sturrus et al. | |
| 6,290,282 B1 * | | 9/2001 | Hortlund et al. | 296/146.6 |
| 6,299,226 B1 * | | 10/2001 | Kroning et al. | 293/120 |
| 6,318,775 B1 * | | 11/2001 | Heatherington et al. | 293/120 |
| 6,398,275 B1 * | | 6/2002 | Hartel et al. | 293/102 |
| 6,416,114 B1 * | | 7/2002 | Topker et al. | 296/146.6 |
| 6,510,771 B2 * | | 1/2003 | Sturrus et al. | 83/54 |
| 6,554,345 B2 * | | 4/2003 | Jonsson | 296/146.6 |
| 6,672,635 B2 * | | 1/2004 | Weissenborn et al. | 293/120 |
| 6,695,368 B1 * | | 2/2004 | Weykamp et al. | 293/154 |
| 6,813,920 B2 * | | 11/2004 | Yoshida et al. | 72/166 |
| 6,814,380 B2 * | | 11/2004 | Yoshida et al. | 293/120 |
| 6,817,638 B1 * | | 11/2004 | Choi et al. | 293/109 |
| 6,863,321 B2 * | | 3/2005 | Jonsson et al. | 293/102 |
| 6,923,482 B2 * | | 8/2005 | Cumming et al. | 293/102 |
| 7,055,886 B2 * | | 6/2006 | Guiles | 296/146.6 |
| 7,066,508 B1 * | | 6/2006 | Baccouche et al. | 293/120 |
| 7,108,303 B2 * | | 9/2006 | Bladow et al. | 293/122 |
| 7,147,258 B2 * | | 12/2006 | Evans et al. | 293/120 |
| 7,197,824 B1 * | | 4/2007 | Graber | 29/897.2 |
| 7,325,435 B2 * | | 2/2008 | Hamel et al. | 72/370.04 |
| 7,344,008 B1 * | | 3/2008 | Jonsson et al. | 188/377 |
| 7,611,175 B2 * | | 11/2009 | Tornberg | 293/102 |
| 7,665,778 B2 * | | 2/2010 | Henseleit | 293/102 |
| 7,758,089 B2 * | | 7/2010 | Lee et al. | 293/102 |
| 7,794,006 B2 * | | 9/2010 | Karlander | 296/102 |
| 7,882,718 B2 * | | 2/2011 | Lyons et al. | 72/168 |
| 7,931,315 B2 * | | 4/2011 | Hori et al. | 293/102 |
| 7,992,927 B2 * | | 8/2011 | Kitai et al. | 296/204 |
| 8,061,034 B2 * | | 11/2011 | Mellis | 29/897.2 |
| 8,307,685 B2 * | | 11/2012 | Heinz et al. | 72/177 |
| 8,333,095 B2 * | | 12/2012 | Heinz et al. | 72/168 |
| 8,662,546 B2 * | | 3/2014 | Kizaki et al. | 293/133 |
| 8,707,749 B2 * | | 4/2014 | Lee et al. | 72/130 |
| 8,716,624 B2 * | | 5/2014 | Johnson et al. | 219/121.64 |
| 8,847,107 B2 * | | 9/2014 | Lee et al. | 219/121.63 |
| 2004/0007886 A1 * | | 1/2004 | Hallergren | 293/102 |
| 2004/0154158 A1 * | | 8/2004 | Sundgren et al. | 29/564 |
| 2005/0162631 A1 * | | 7/2005 | Graber | 355/67 |
| 2005/0285414 A1 * | | 12/2005 | Liu et al. | 293/102 |
| 2009/0165520 A1 * | | 7/2009 | Koo et al. | 72/168 |

\* cited by examiner

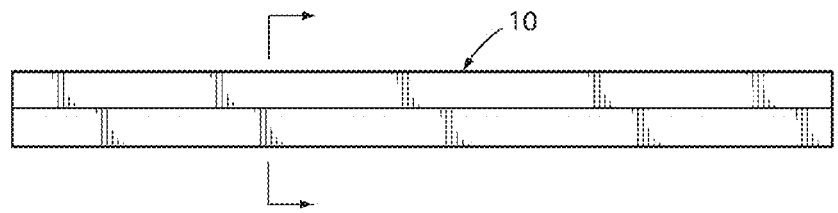
FIG. 1
Prior Art
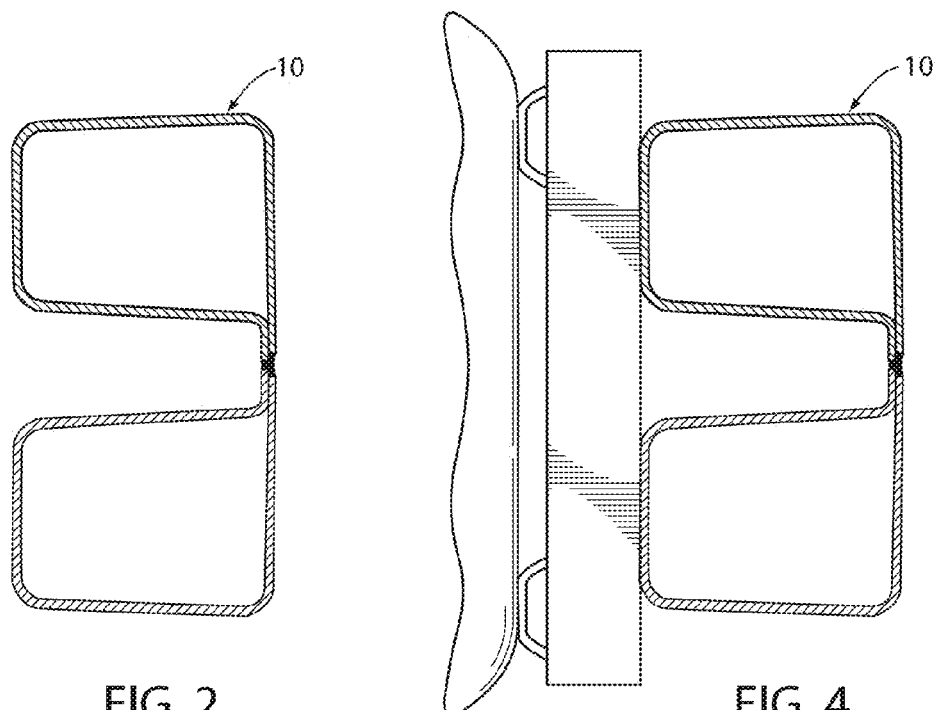
FIG. 2
Prior Art
FIG. 4
Prior Art
FIG. 3
Prior Art

BEAM WITH VARIED BENDING MOMENT, APPARATUS, AND METHOD

This application claims benefit under 35 USC section 119 (e) of U.S. Provisional Application Ser. No. 61/889,750, filed Oct. 11, 2013, entitled BEAM WITH VARIED BENDING MOMENT, APPARATUS, AND METHOD, the entire disclosure which is hereby incorporated by reference in its entirety.

BACKGROUND

The present invention relates to structural beams used as bumper reinforcement beams in vehicle bumper systems, although the present innovation is not limited to only vehicle bumper systems.

Many reinforcement beams in vehicle bumper systems are roll formed, due to the advantages in high volume of dimensional consistency and low cost. In roll forming processes, a sheet is typically rolled into a constant cross section (e.g. tubular or open channel) and then cut to length. Sometimes the beam is longitudinally curved (called "sweeping") as part of the roll forming process or as a secondary operation after the roll forming process. For example, see Sturrus U.S. Pat. Nos. 5,454,504, and 5,104,026 and 6,240,820. Low weight and high strength-to-weight ratio are important properties in bumper reinforcement beams since heavier vehicles get lower gas mileage and tend to emit greater amounts of pollution. Further, lower weight can mean less material and lower part costs. However, an improvement is desired that maintains functional requirements of a particular bumper reinforcement beam, but that reduces weight and provides optimized strength-to-weight ratio. Also, an improvement is desired that optimizes torsional and bending strength in longitudinal areas along a length of the beam while minimizing weight.

SUMMARY OF THE PRESENT INVENTION

In one aspect of the present invention, a structural beam includes a reinforcement beam having a length and mounts at ends of the beam and cross sectional shapes at various locations along the length, including a first cross sectional shape near ends of the beam providing a first bending moment and a second cross sectional shape at a center of the beam providing a second bending moment different than the first bending moment, and further including intermediate cross sectional shapes between the ends and center having intermediate bending moments between the first and second bending moments. The second cross sectional shape has an identical profile to a portion of the first cross sectional shape.

In another aspect of the present invention, a bumper reinforcement beam for a vehicle bumper system, comprises a beam having a length and a plurality of transverse cross sectional shapes, with at least one cross sectional shape near a center of the beam defining a largest cross sectional shape and other of the cross sectional shapes being only a portion of the largest cross sectional shape, such that a first cross sectional shape near ends of the beam provides a first bending moment and a second cross sectional shape at a center of the beam provides a second bending moment less than the first bending moment, and vehicle-frame-engaging mounts on ends of the beam.

In another aspect of the present invention, a method comprising steps of providing a blank with non-uniform edges, and forming the blank to form a beam having a length and ends and transverse cross sectional shapes at various locations along the length, including a first cross sectional shape near ends of the beam providing a first bending moment and a second cross sectional shape at a center of the beam providing a second bending moment different than the first bending moment, and further including intermediate cross sectional shapes between the ends and center having intermediate bending moments between the first and second bending moments. The method further includes attaching vehicle mounts to ends of the beam.

In another aspect of the present invention, an apparatus includes a blank-forming device with trimming device to form a blank with non-uniformities; and a forming device that forms a beam from the blank, the beam having a length and mounts at ends of the beam and transverse cross sectional shapes at various locations along the length, including a first cross sectional shape near ends of the beam providing a first bending moment and a second cross sectional shape at a center of the beam providing a second bending moment different than the first bending moment, and further including intermediate cross sectional shapes between the ends and center having intermediate bending moments between the first and second bending moments.

In another aspect of the present invention, a method comprises steps of roll forming a strip of material to form a first beam having a length and ends and a constant transverse cross sectional shape along the length, and secondarily removing unwanted material from the first beam to form a modified beam having different transverse cross sectional shapes at specific locations along the length, with each one of the different transverse cross sectional shapes providing a desired beam torsion strength and beam bending strength at the specific locations.

In another aspect of the present invention, a method comprises the steps of roll forming a strip of material to form a first beam having a length and ends and a constant transverse cross sectional shape along the length, providing a laser device, and generating a laser to selectively cut away unwanted material from the first beam to form a modified beam having different transverse cross sectional shapes at specific locations along the length, with each one of the different transverse cross sectional shapes providing a desired beam torsion strength and beam bending strength at the specific locations.

In another aspect of the present invention, a method comprises the steps of roll forming a strip of material to form a first beam having a length and ends and a constant transverse cross sectional shape along the length, and secondarily removing unwanted material from ends of the first beam to form a modified beam having different transverse cross sectional shapes at specific locations along the length, with each one of the different transverse cross sectional shapes providing a desired beam torsion strength and beam bending strength at the specific locations.

In another aspect of the present invention, a method comprises the steps of roll forming a strip of material to form a first beam having a length and ends and a constant transverse cross sectional shape along the length, and secondarily removing unwanted material from the first beam to form a modified beam having different transverse cross sectional shapes at specific locations along the length, with each one of the different transverse cross sectional shapes providing a desired beam torsion strength and beam bending strength at the specific locations, wherein the step of removing the unwanted material includes forming a rear surface on the beam's ends configured to support bumper attachment brackets for attaching the modified beam to a vehicle frame.

In another aspect of the present invention, a method comprises the steps of roll forming a strip of material to form a first beam having a length and ends and a constant transverse cross sectional shape along the length, and secondarily removing unwanted material from the first beam to form a modified beam having different transverse cross sectional shapes at specific locations along the length, with each one of the different transverse cross sectional shapes providing a desired beam torsion strength and beam bending strength at the specific locations, wherein the step of removing the unwanted material includes forming a first cross sectional shape near ends of the beam with a first bending moment, and forming a second cross sectional shape at a center of the beam with a second bending moment different than the first bending moment, and further forming intermediate cross sectional shapes between the ends and center having intermediate bending moments between the first and second bending moments.

These and other aspects, objects, and features of the present invention will be understood and appreciated by those skilled in the art upon studying the following specification, claims, and appended drawings.

BRIEF DESCRIPTION OF DRAWINGS

FIGS. 1-3 are orthogonal views of a prior art bumper reinforcement beam made according to Sturrus U.S. Pat. No. 5,454,504; FIG. 4 is a top view of the beam in FIG. 1 attached to a vehicle frame by mounts.

DESCRIPTION OF PRIOR ART

Figure 5:
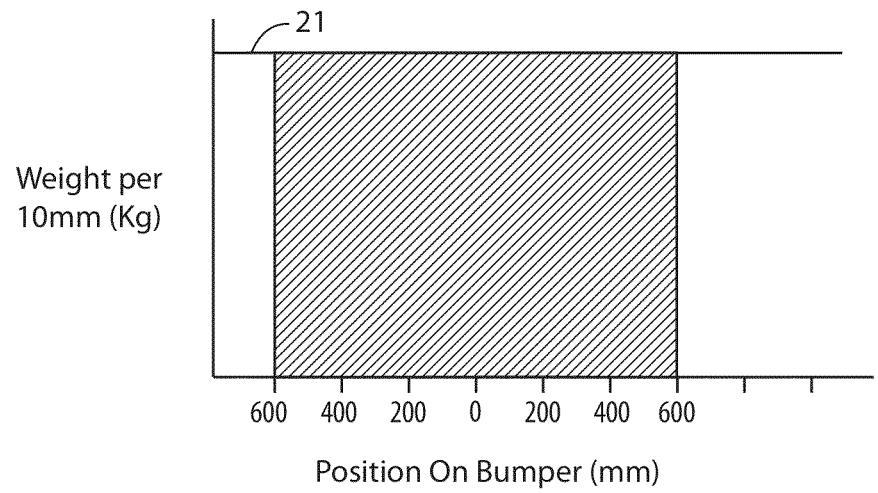
FIGS. 5-6 are graphs illustrating a weight per longitudinal unit and a beam moment per longitudinal unit for the beam in FIG. 1, respectively.
Figure 6:
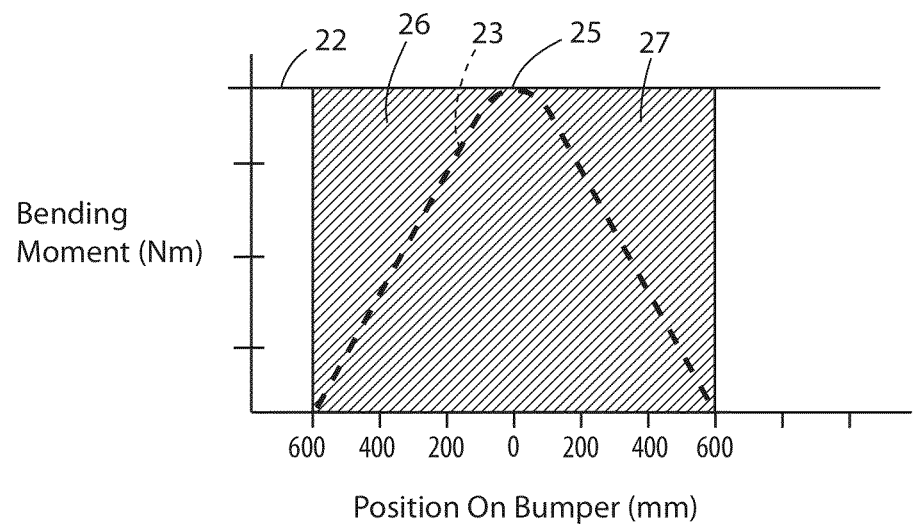

Sturrus U.S. Pat. No. 5,454,504 discloses a prior art bumper reinforcement beam 10 (FIGS. 1-4) where the beam 10 is attached to a vehicle frame by mounts (see FIG. 4). The beam 10 has a constant cross sectional shape, such that the beam 10 has a constant weight per longitudinal unit (illustrated by the horizontal line 21 in FIG. 5) and a constant beam moment per longitudinal unit (illustrated by horizontal line 22 in FIG. 6). When the required bending moment is not constant along a length of the beam, such as shown by dashed line 23, the beam's bending moment 22 must still be designed to meet the maximum bending moment required. The beam 22 results in "excess" material at locations 26 and 27 spaced from the center location 25, because material in the beam 10 cannot be reduced even though the material is not needed to meet the (lower) bending moment requirement at the ends. In other words, in FIG. 6, the beam 10 has "excess" material at end locations, resulting in excess weight in the beam 10.

Sturrus U.S. Pat. No. 5,104,026 discloses in FIG. 2 a roll formed beam having an end crushed to a different shape with reduced cross section. However, all material remains in the beam. Sturrus U.S. Pat. No. 6,240,820 discloses a roll formed beam with ends cut to different cross section. However, the cut area is to provide a flat region for the vehicle mount and is limited to an area at the mount, and concurrently does not substantially affect areas inboard of the mounts.

DETAILED DESCRIPTION OF PREFERRED EMBODIMENTS

The present bumper reinforcement beam 50 (FIGS. 7-9) includes a varied cross section and concurrently a varied bending moment along its length L, due to a changing cross section that provides a lower bending moment near ends 51 of the beam 50 (where the beam 50 is mounted to a vehicle frame 52 via mounts 53), and provides a higher bending moment near a center location 54 (where the beam 50 requires a greatest bending moment to pass FMVSS bumper safety standards during vehicle bumper testing). The present beam 50 is referred to as a "C-D-C" beam since its cross section changes from an open C-section at one end (FIGS. 10A-10C) to a closed tubular (D) section near its middle (FIGS. 10D-10F) and then back to an open C-section at its other end (FIGS. 10G-10I). Notably, the first cross sectional shape near ends of the beam 50 has an identical profile but it is limited to only a portion of the second cross sectional shape at the beam's center. This facilitates forming the beam in a roll former to have optimal torsional and bending strength along its length L, but low total weight, as discussed below.

More specifically, near the mounts 53, the beam's bending moment does not need to be as large since impact forces against the beam 50 have a relatively short distance to the mounts, and thus impact forces are transmitted relatively directly into the mounts (reducing the need for a large bending moment). Contrastingly, near a center of the beam 50, the beam's bending moment is necessarily relatively large, since impact forces against the beam 50 have a relatively longer distance to the mounts, which thus requires a much larger beam bending moment. The illustrated beam 50 is designed to accomplish this by being constructed from a blank 55 (FIG. 10) having a non-uniform width along its length. The blank 55 is rolled to form a tubular B (or D) section along it middle one-third, and to form open C sections along its outer one-thirds at each end.

Figure 10:
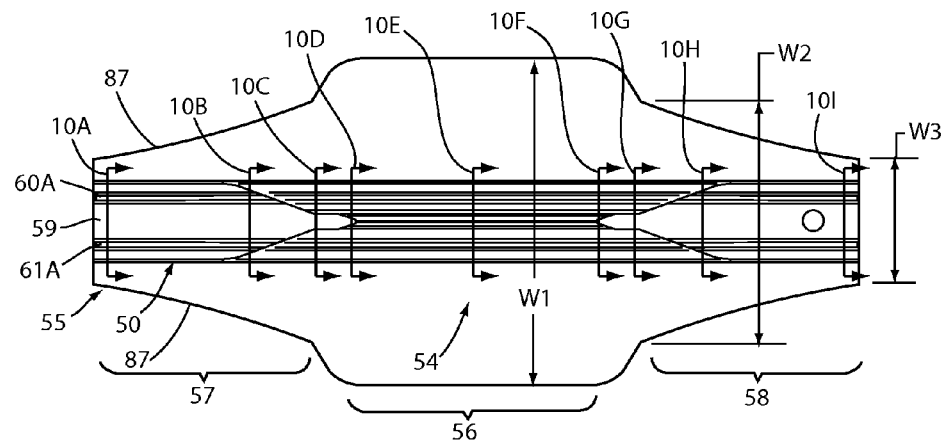
FIG. 10 is a rear view of the beam overlaid onto a flat blank before roll forming.

In FIG. 10, the beam 50 is overlaid on the blank 55 to show how portions of the blank end up forming related portions of the beam 50. Specifically, one third of the illustrated beam 50 is formed by a center section 56 of the blank 55 where the blank 55 has a generally constant width W1. The remaining one-third of the beam 50 is formed by end sections 57 and 58. The end sections 57 and 58 quickly narrow at locations 59 to a width W2 and then generally taper inward toward a narrower width W3 at their ends. When roll formed, the center section 56 forms a tubular B section with spaced-apart tubes 60 and 61, and the end sections 57 and 58 become open C sections with changing depths thinning toward the outer ends of the beam 50. The sections 56, 57, and 58 share a continuous constant-shaped front wall 59 with two channel ribs 60A and 61A that extend a length L of the beam 50. The front wall 59 extends generally vertically to define a substantially constant height H, but the illustrated beam 50 is longitudinally curved (i.e. "swept") to match an aerodynamic shape often given modern vehicle front bumpers. The sections 56, 57, and 58 also share common top and bottom walls 62 and 63. The center section 56 also includes top and bottom aligned rear walls 64 and 65 and intermediate walls 66 and 67, each of which extend outward from the center section, and abutting walls 68 and 69 that are welded to a center of the front wall 59. The specific cross sectional shapes along beam 50 are shown in FIGS. 10A-10I.

Figure 7:
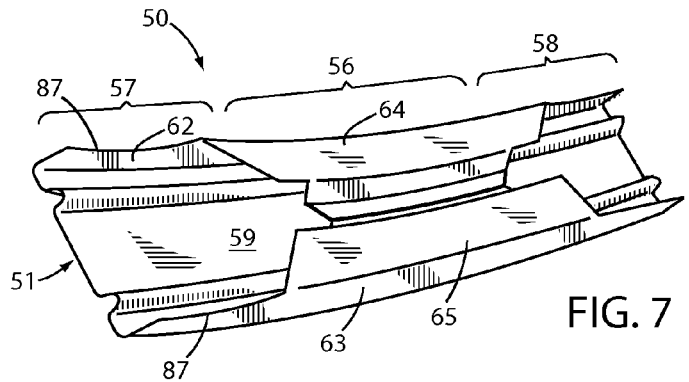
FIGS. 7-9 are perspective, top and rear views of a B-shaped reinforcement beam having a varied moment of inertia along its length and embodying the present invention.
Figure 7A:
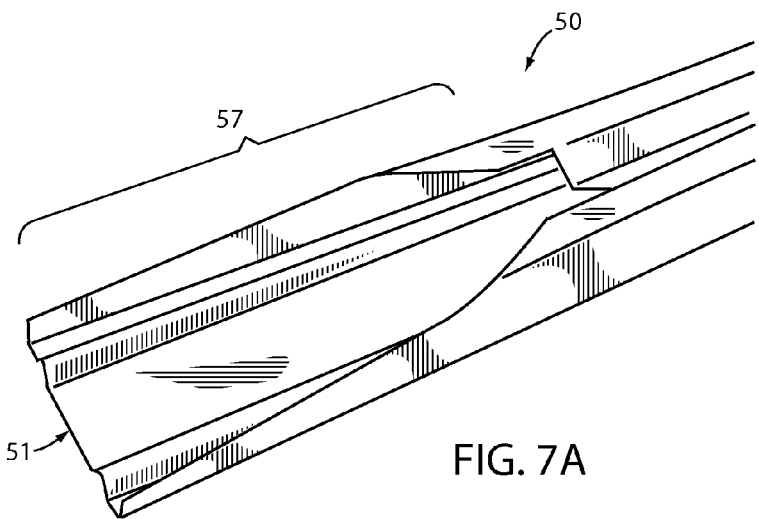
FIGS. 7A and 7B are perspective views of a B-shaped reinforcement beam with modified end sections giving the varied bending strength.
Figure 7B:
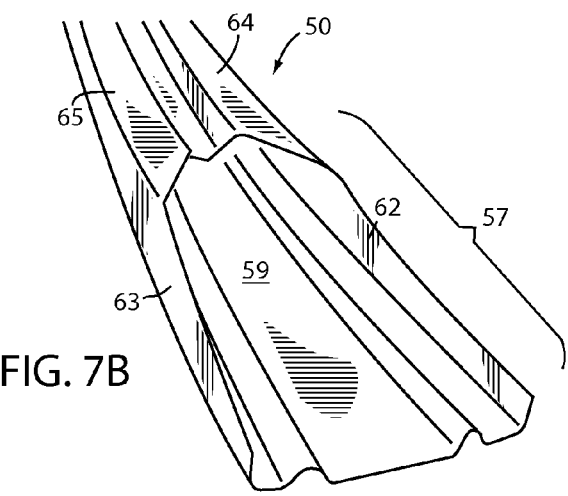
Figure 8:
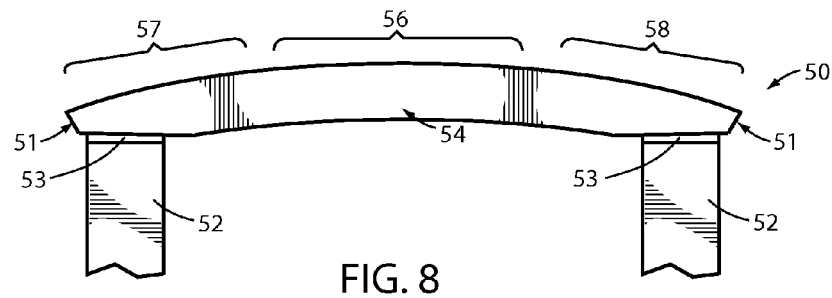
Figure 9:
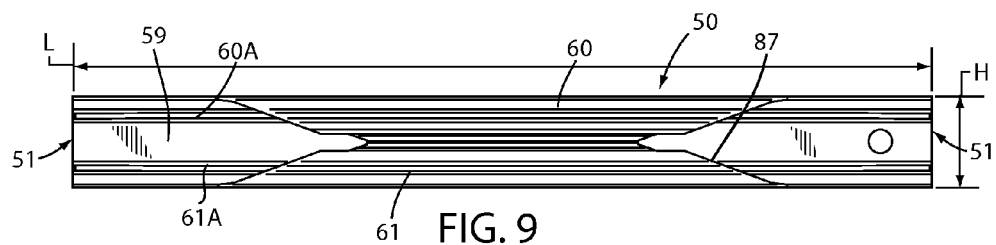
Figures 10A, 10B, 10C, 10D, 10E, 10F, 10G, 10H, 10I:
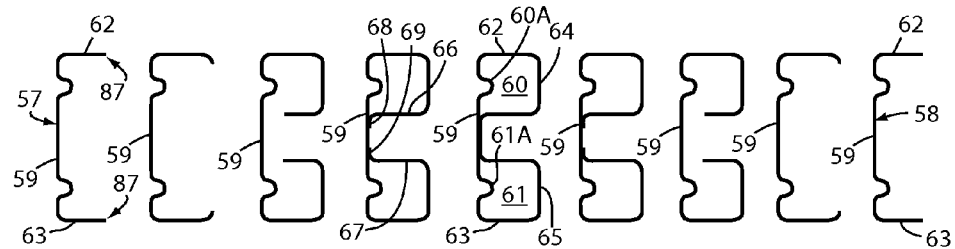
FIGS. 10A-10I are cross sections taken along lines 10A-10I in FIG. 10.
Figure 11:
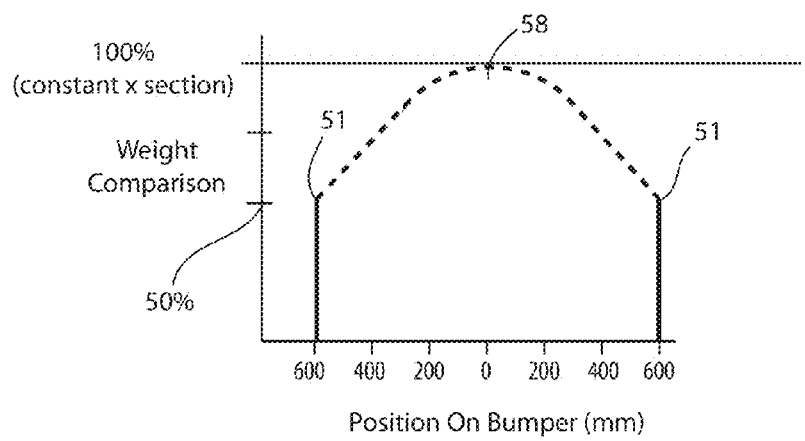
FIGS. 11-12 are graphs illustrating a weight per longitudinal unit and a beam moment per longitudinal unit, respectively.
Figure 12:
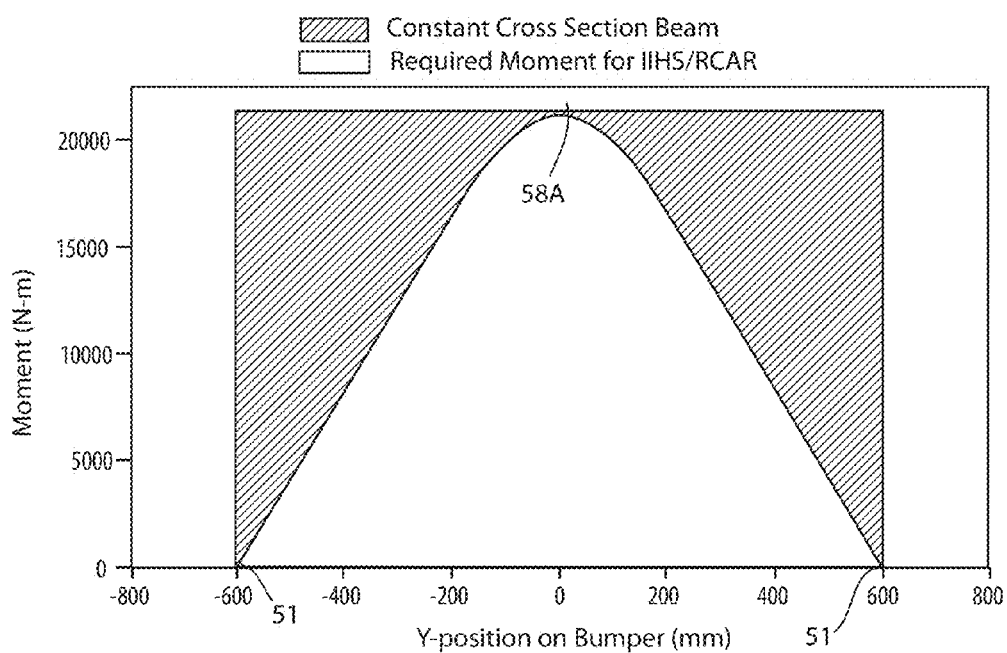

FIG. 11 is a graph illustrating a weight per longitudinal unit of the bumper reinforcement beam 50 of FIGS. 7-9, and FIG. 12 is a graph illustrating a beam moment per longitudinal unit of the beam 50 of FIGS. 7-9. Notably, a weight of the innovative beam of FIGS. 7-9 is lower at ends 51 of the beam 50 (see sections 56 and 57) than in a center (see location 58) due to cut-away material. The difference in weight of beam 50 can be as much as 10%-20% less than prior art beams having a constant cross section (e.g. beam 10), including as much as 30-50% reduction in weight at ends 51 of the beam 50 from its center 58. Also, the bending moment varies along a length of the beam 50, with a lesser bending moment being adjacent the mounts 53, and a higher bending moment being at the center 58. The difference in bending moment is substantial, since the required bending moment at the mounts 53 is essential zero since impact loads at those locations are transferred directly through the beam ends 51 into the mounts 53 without the beam ends 51 having to provide stress resistance via a bending moment reactive force. However, at locations close to the center line 58A, a maximum bending moment is required because the center line 58A is located a maximum distance from the mounts 53, thus requiring the bending moment in order to provide an adequate resistive/reactive force.

Notably, the center line 58A has a relatively higher bending moment due to additional material at the center (see the blank 55) and due to the cross section being tubular (which tends to have a higher bending moment due to geometrical forces associated with the tubular shape) and has a deeper cross section. Contrastingly, the ends 51 have a relatively lower bending moment due to less material at the ends (see blank 55) and also due to the fact that the cross section is an open C shape (which tends to have a lower bending moment due to geometric forces associated with the open shape) and has a thinner cross section.

It is noted that the pattern created by graphing the bending moment of the illustrated beam 50 (see FIG. 12) against locations along its length creates a generally triangularly shaped curve with relatively flat angled side portions but with radiused center portion, with the bending moment continuously changing from zero at the ends 51 to a maximum number at the center line 58A. However, it is contemplated that specific cross sectional shapes and bending moments given to the beam at any particular location can be strategically set by carefully determining an optimal shape of the blank for making the beam.

Figure 13:
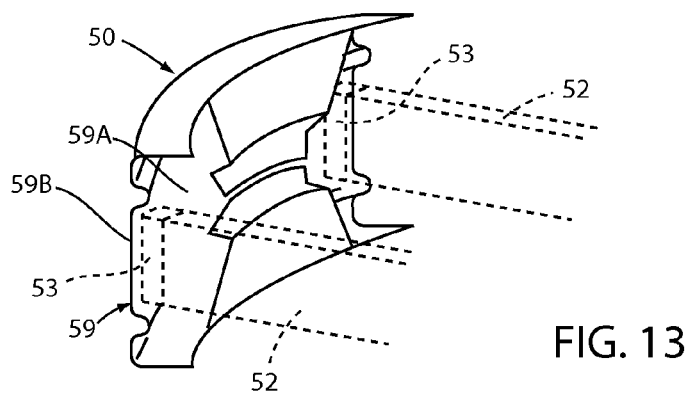
FIG. 13 is a side view of the beam of FIG. 7 attached to a vehicle frame.
Figure 14:
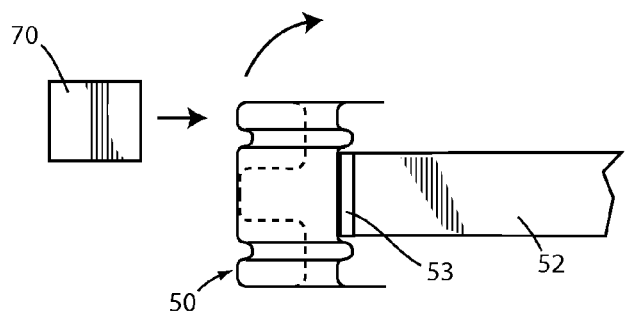
FIG. 14 is a side view showing an impact against the beam that is vertical offset upwardly on the beam, thus causing a torsional load along the beam.

FIG. 13 illustrates a beam 50 mounted to a vehicle frame 52 at mounts 53 at outer ends of the beam 50. As shown in FIG. 13, the mounts 53 may be disposed at a rear surface 59A of the front wall 59, opposite a front surface 59B, between the top and bottom walls 62, 63. FIG. 14 illustrates that an impactor 70 may strike the beam 50 at a non-centered height (i.e. above its mid-point, as shown in FIG. 14), such that the beam 50 may undergo significant torsional loads. It is noted that these torsional loads do not necessarily correspond to the bending moment loads. In other words, even though the bending moment strength required of the beam 50 may be different at different locations and define a first load curve, the beam must also withstand torsional loading requirements, which may be distributed quite different than the bending moment requirements. The point is that this information can be incorporated into a blank so that when the beam is formed, an optimally shaped beam 50 results.

Figure 27A:
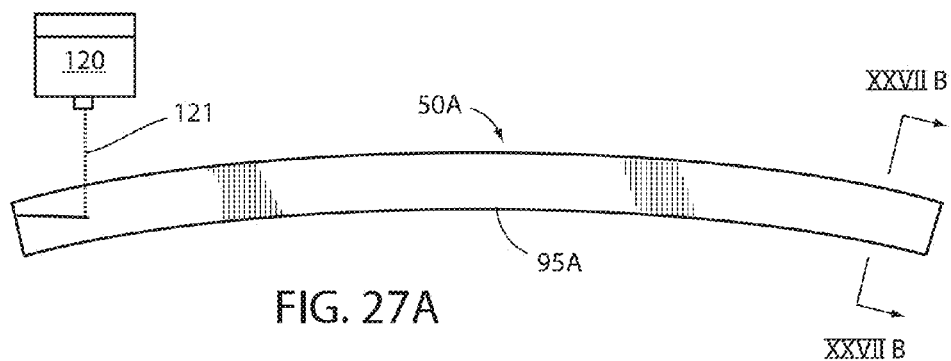
FIGS. 27A-27B, 28-29 disclose a beam similar to the beam in FIGS. 18-20, but made by using a modified method where a beam with constant cross section is roll formed and then secondarily cut to have a shape like the beam in FIGS. 18-20, FIGS. 27A-27B being top and end views of the beam prior to secondarily cutting away portions of the beam, and FIGS. 28-29 being top and rear views of the beam after portions are secondarily cut away.
Figure 27B:
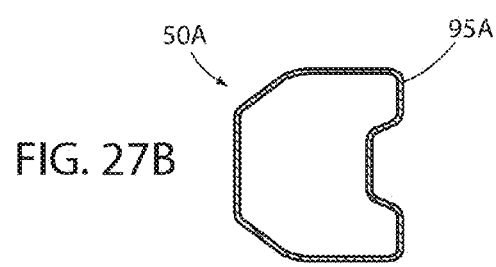
Figure 28:
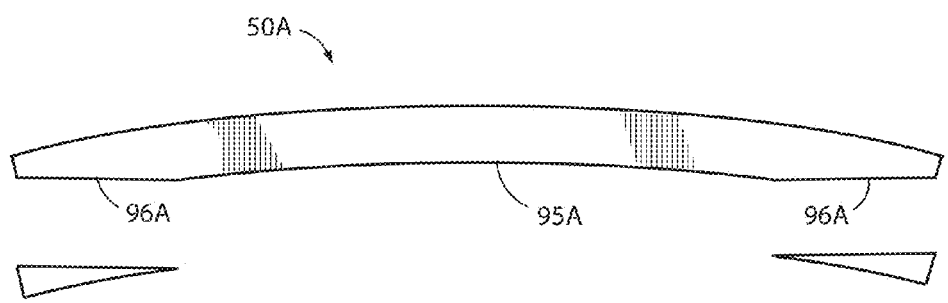
Figure 29:
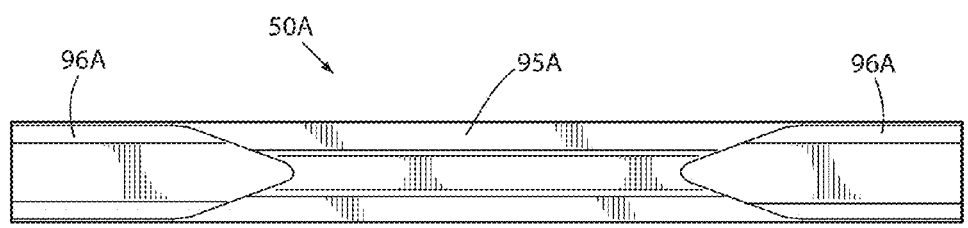

It is contemplated that the beam 50 can be made in different ways. For example, the beam 50 can be made solely by roll forming a blank having a non-uniform width, as discussed above (and see FIGS. 7-10I). Alternatively, the beam 50 can be made using a combination of roll forming and secondary processing (see FIGS. 27A, 27B, 28-29). It is contemplated that the roll formed continuous beam in this alternative process can define an open constant cross section (such as a "C" or "L" or "I" shape), or can define a closed cross sectional shape (such as a "D" single tube, or "B" double-tube with single-center-leg or "B" double-tube with spaced-apart tubes). For example, as shown in FIGS. 27A-27B, the beam of continuous constant cross section can be first roll formed, then swept (if desired), and then cut to a desired final shape to form beam 50 by cutting away unwanted portions. FIG. 27A illustrates the method as includes a laser device 120 generating a laser 121 that cuts material along a desired line to remove triangularly-shaped (scrap) end pieces (see FIG. 28). However, it is contemplated that the triangularly-shaped pieces can be any shape, any location on the beam, and can be done by other means, such as by stamping or plasma-cutting away parts of the beam. When stamping or mechanical shearing-off of the scrap end piece is done, a guillotine-style blade can be used, and if necessary, internal and external mandrels can be used to support the end of the beam to prevent undesired deformation of a cross section of the remaining-attached end portion of the beam. For the reader's benefit, we refer to Sturrus U.S. Pat. No. 6,510,771, the entire contents of which are incorporated herein for its teaching and disclosure, which discloses an end-cutting bumper-end-stamping operation.

Figure 21:
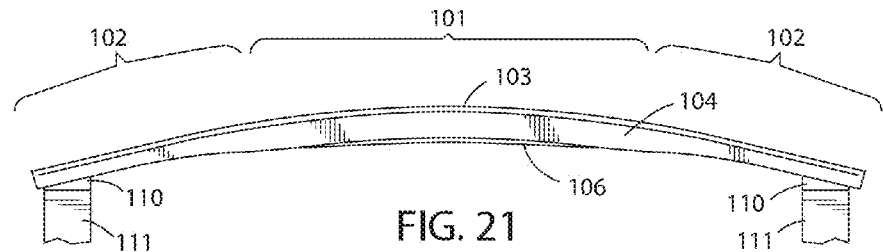
FIG. 21 is a top view of a second embodiment of the present inventive beam.
Figure 22:
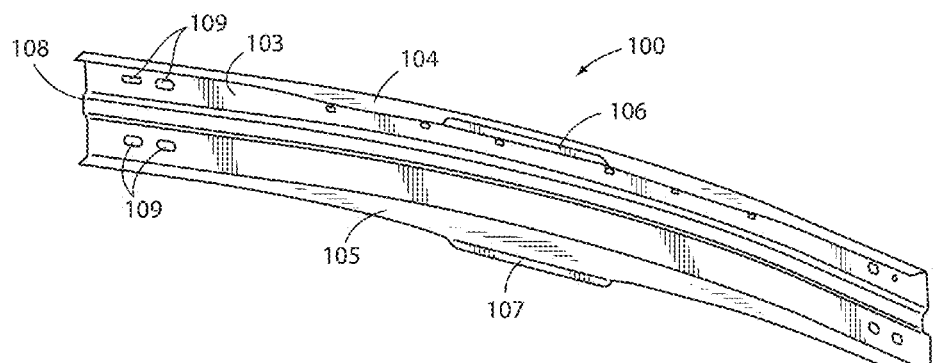
FIGS. 22-23 are rear and front perspective views of FIG. 21.

Notably, the longitudinal curvature of beam 50 can be imparted into the beam either as part of the roll forming process at a sweep station, or can be imparted secondarily after the roll forming process such as by stamping. It is contemplated that a beam 50 including the up flange (see up flange 106, FIG. 21) can be formed by cutting the beam 50 to include an extended flange that can be reformed in a secondary process to emulate up flange 106, discussed below. In one form, the constant cross sectional beam is roll formed with a straight flange that can be reformed/bent to define the desired up flange (106). In another form, part of a center of the beam is cut to leave a flange that can be reformed into the desired up flange.

Figure 15:
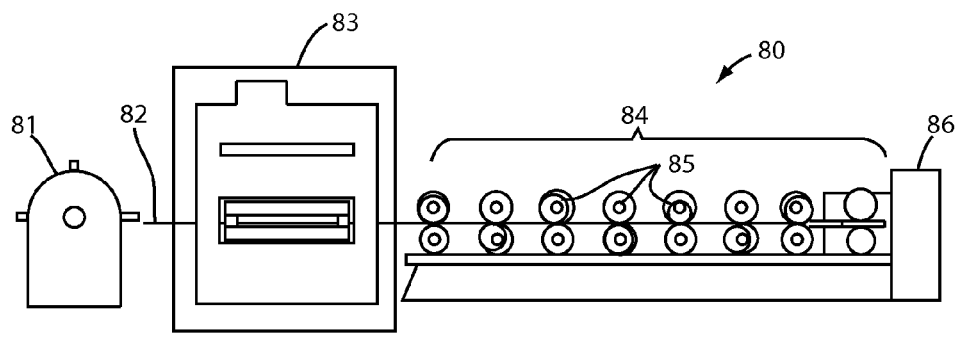
FIG. 15 is a schematic view of the roll forming process using a pre-pierced, pre-cut blank.
Figure 16:
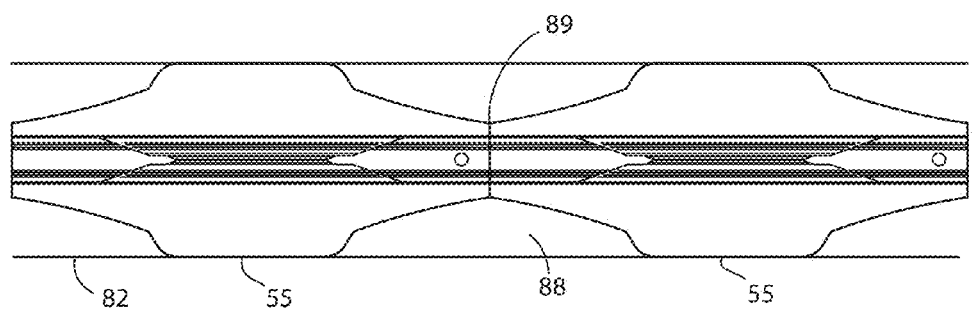
FIG. 16 us a plan view of a continuous strip pre-pierced and pre-cut to form series of blanks.

FIG. 15 illustrates a roll forming process 80 including an unroller device 81 feeding a roll of sheet 82 into a stamping device 83 (or irregular slitter) and then into a roll former 84 with rolls 85 for forming the beam 50 and then to a cutoff device 86. FIG. 16 illustrates a shape of the sheet 82 as it passes through the stamping device 83, where edges 87 of the sheet 82 are trimmed to remove waste material 88. It is contemplated that the stamping device 83 can leave the blanks 55 interconnected at location 89, in which case the blanks 55 "lead" each other through the roll former 84 and are cut apart at an end of the process. Alternatively, it is contemplated that the blanks 55 can be separated at locations 89, in which case each blank 55 is fed individually through the roll former 84. It is contemplated that a sweeping station can be positioned at an end of the roll former 84, or that a linear beam can be formed and then struck in a secondary operation to form the sweep in the beam 50.

Figure 16A:
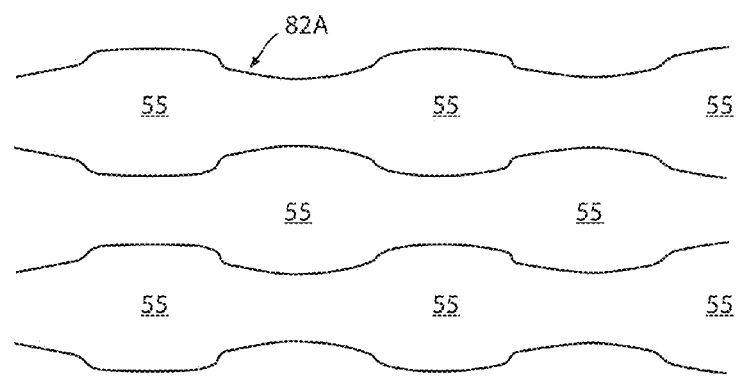
FIG. 16A is a plan view of a wider continuous sheet with a modified cut to form three adjacent strips of pre-pierced pre-cut blanks like those in FIG. 16 and with edges abutting to reduce wasted material.

FIG. 16A illustrates that the sheet 82A can be sufficiently wide for form multiple blanks 55 across its width in a manner reducing waste. Specifically, in sheet 82A, a wider part of one blank fits into a concavity in adjacent blanks, thus reducing waste material cut from the blanks during the slitting process. It is noted that a laser slitter or other means for slitting a blank having a non-uniform width can be used.

Figure 17:
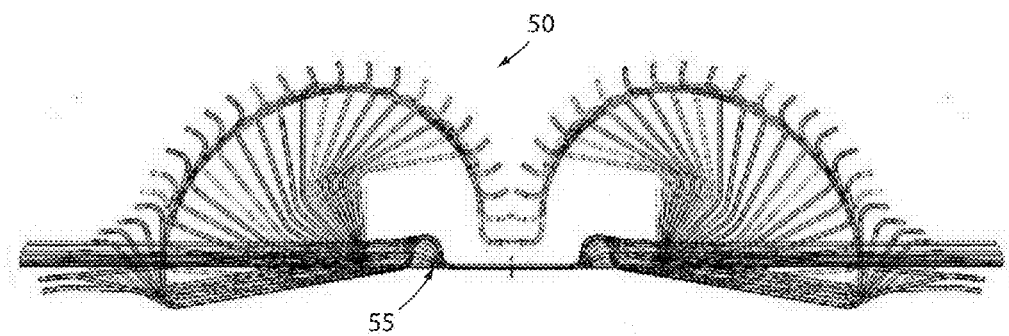
FIG. 17 is a flower diagram showing bending of a flat blank into the final shape of a B-shaped beam with varied bending moments as per FIG. 7.

FIG. 17 is a flower diagram showing bending of a flat blank 55 into the final shape of a B-shaped-cross-section beam 50 with varied bending moments as per FIG. 7.

Figure 18:
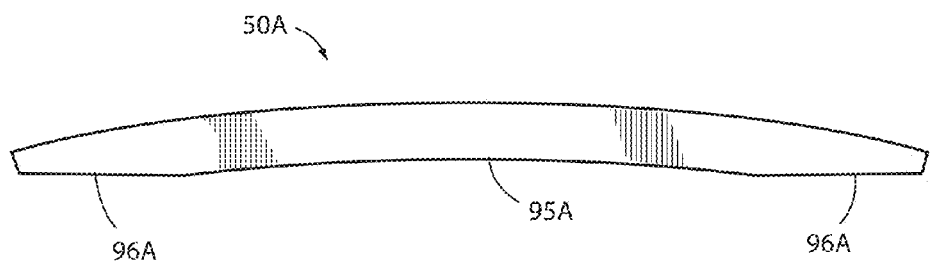
FIGS. 18-20 are top, rear and cross sectional views of a D-shaped beam having a varied moment of inertia along its length and embodying the present invention.
Figure 19:
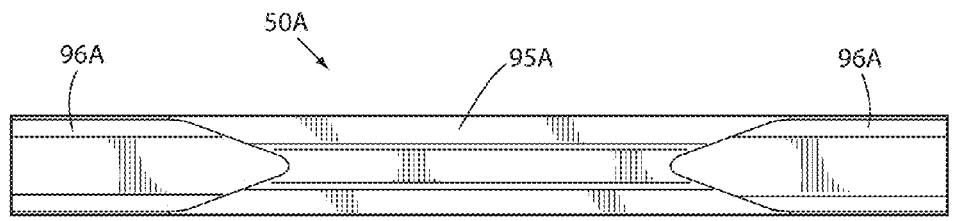
Figure 20:
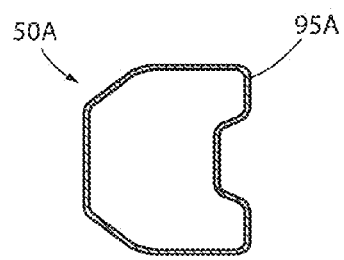

FIGS. 18-20 are top, rear and cross sectional views of a D-shaped beam 50A having a varied moment of inertia along its length and embodying the present invention. It is noted that a blank similar to blank 55 can be used to make a D-shaped beam 50A (swept or linear), with a center of the beam 50A having a (single) tubular shape 95A and ends of the D-shaped beam 50A defining a C channel section 96A. The beam 50A can be longitudinally swept or made to be linear.

A second embodiment beam 100 (FIGS. 21-25) is similar to the beam 50 in terms of having a changing longitudinal cross sectional shape, but a center region is left open and not formed into a tube. Thus, the present beam 100 is referred to as a "C-C-C" beam. Nonetheless, the center C section extends a greater distance and thus provides a greater torsional and bending strength than its ends. Also, material location and properties are optimized.

Specifically, beam 100 includes a center section 101 and end sections 102, formed by a front wall 103, top and bottom flanges 104 and 105, and up flange 106 and down flange 107. The illustrated front wall 103 extends a full length of the beam 100, and includes a centered channel 108 forming a rib along its full length. The illustrated channel 108 includes a flat bottom and flat angled sides leading to the flat bottom, with the flat angled sides and bottom providing improved strength over a similar channel having radiused sides and bottom. A cross sectional size and shape of the illustrated channel are constant along the full length. Nonetheless, it is contemplated that the channel can have a different cross section or that the channel depth/shape can be varied along its length. The top and bottom flanges 104 and 105 extend a full length of the beam, but are foreshortened near ends of the beam 100. The illustrated flanges 104 and 105 are identical to each other, though it is contemplated that they do not need to be if there is a functional reason to make them different shapes. The up flange and down flanges 106 and 107 only extend a length of the center section 101, and are relatively constant in their vertical dimension. The up and down flanges 106 and 107 are identical to each other, though it is contemplated that they do not need to be if there is a functional reason to make them different shapes. Mounting holes 109 for attaching the beam 100 to a mount 110 (or for attaching to a crush tube 111 on a vehicle frame rail tip) are provided.

Figure 23:
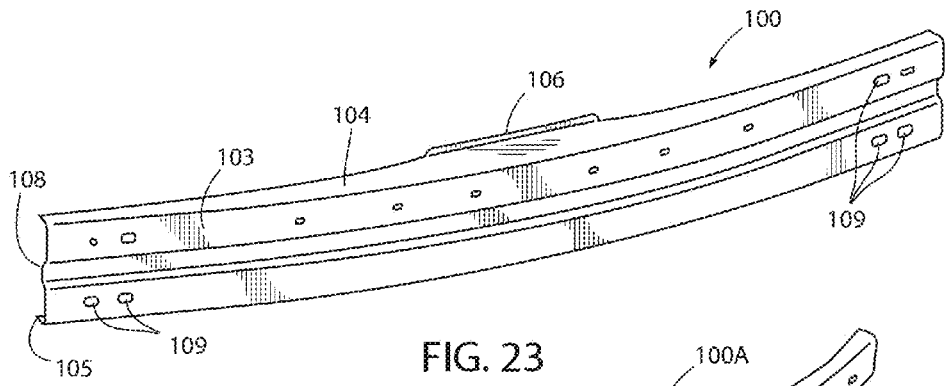
Figure 23A:
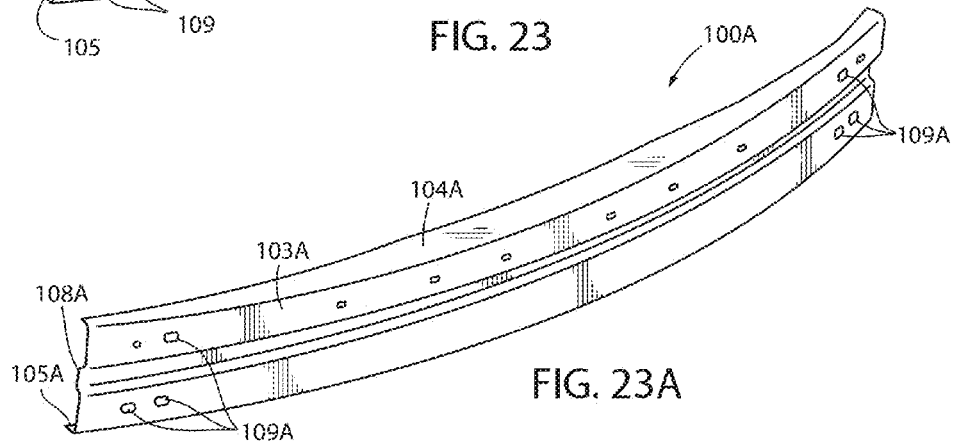
FIG. 23A is a view of a modified beam similar to the beam in FIG. 23 but with up and down flanges eliminated.
Figure 24:
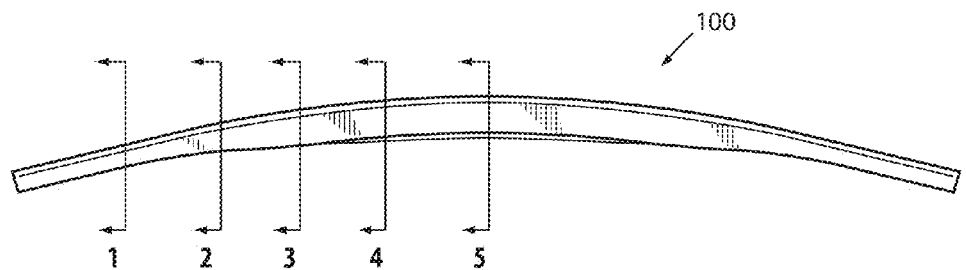
FIG. 24 is a top view like FIG. 21, but showing several cross section lines labeled 1-5.
Figure 25:
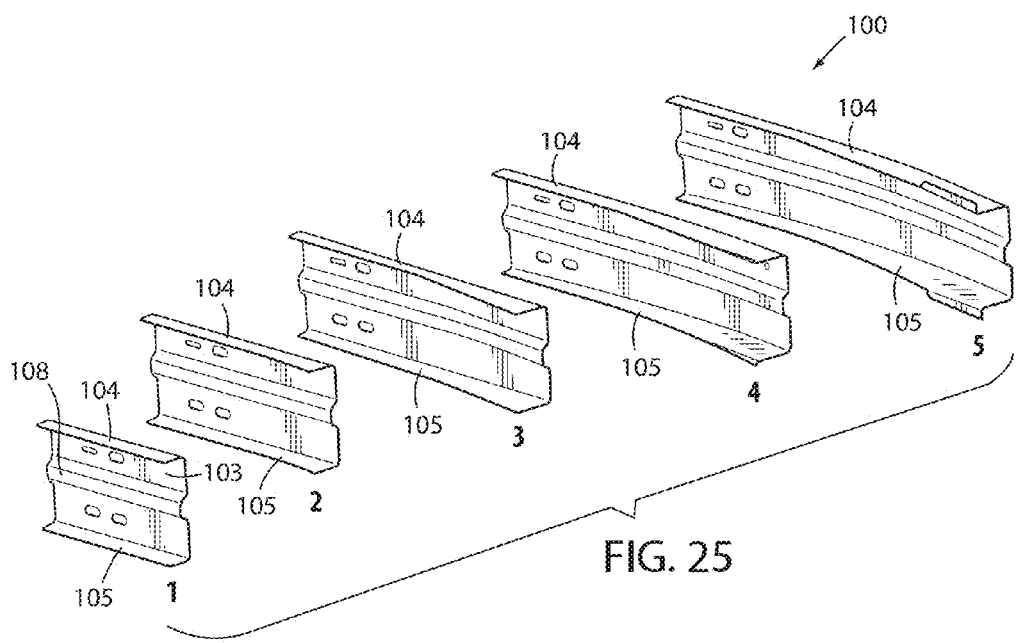
FIG. 25 includes several perspective views taken along the cross section lines 1-5 in FIG. 24.

FIG. 23 is a view of a modified beam 100A similar to the beam 100 in FIG. 23 but with up and down flanges (106, 107) eliminated.

Figure 26:
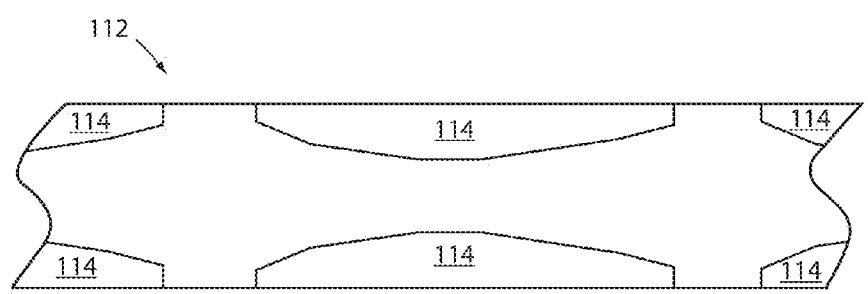
FIG. 26 is a plan view of a blank cut from an unrolled strip of sheet material for forming the beam of FIGS. 21-25.

In one form, a blank 112 (FIG. 26) for making beam 100 is cut (or stamped) from a strip of unrolled steel ahead of a roll former apparatus, by removing scrap portions 114. Holes 109 can also be formed in the blank 112 at the same time. The ends of blanks 112 are left connected until after the roll forming operation, at which time the roll-formed beam segments are cut from each other. It is contemplated that the beam segments can be longitudinally swept by a sweep station positioned at an end of the roll former apparatus if desired.

In another form, a beam 50 (FIGS. 27A-27B) is formed having a continuous constant cross sectional shape, and then secondarily reformed to remove unwanted material. As noted previously, the beam is swept if desired, either at an end of the roll forming process or in secondary tooling. Then the beam is then cut using a secondary process such as the illustrated laser device 120 that generates a laser 121 directed along the beam to cut away unwanted portions of the beam to leave a beam 50 with varied torsional and bending strength along its length, as shown. As discussed previously, a stamping or other re-forming process can be used instead of a laser if desired.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A bumper reinforcement beam comprising:
    a beam having a length defined between ends of the beam and adapted to span across a vehicle frame, the beam comprising a single sheet of metal that is formed to have a continuous front wall that extends the length of the beam with a substantially constant height and top and bottom walls that integrally extend rearward from respective top and bottom portions of the continuous front wall along the length of the beam;
    mounts at end sections of the beam for engaging the vehicle frame, the mounts disposed at a rear surface of the front wall between the top and bottom walls;
    wherein a center section of the beam, between the end sections, includes a top rear wall that integrally extends downward from a rear portion of the top wall and a bottom rear wall that integrally extends upward from a rear portion of the bottom wall;
    wherein the rear portions of the top and bottom walls at the end sections of the beam each include an edge of the sheet of metal that forms the beam;
    wherein the sheet of metal that forms the beam, when laid flat, includes a width between its edges that decreases from the center section of the beam toward the ends of the beam for providing a first cross sectional shape at the end sections of the beam that has a first bending moment and a second cross sectional shape at the center section of the beam that has a second bending moment greater than the first bending moment; and wherein the beam includes intermediate cross sectional shapes between the first cross sectional shape and the second cross sectional shape having respective intermediate bending moments that increase from the first bending moment to the second bending moment.

2. The bumper reinforcement beam defined in claim 1, wherein the beam at the first cross sectional shape defines an open channel consisting of the front, top, and bottom walls, and wherein the beam at the second cross sectional shape includes at least one tube comprising the front, top, bottom, top rear, and bottom rear walls.

3. The bumper reinforcement beam defined in claim 1, wherein the top and bottom rear walls are vertically aligned with each other and substantially parallel with the front wall.

4. The bumper reinforcement beam defined in claim 1, wherein the top and bottom walls at the center section of the beam extend rearward a greater distance than at the ends of the beam.

5. The bumper reinforcement beam defined in claim 1, wherein the beam includes intermediate walls that integrally extend forward from the top and bottom rear walls at a center of the center section and attach to the rear surface of the front wall to define spaced-apart tubes.

6. The bumper reinforcement beam defined in claim 5, wherein the front wall includes a rearward protruding rib along the length of the beam.

7. A bumper reinforcement beam comprising:
a beam having a length with a longitudinal curve spanning between ends of the beam that is adapted for an aerodynamic shape of a vehicle;
mounts disposed at end sections of the beam, on opposing longitudinal sides of a center section of the beam, for engaging a frame of the vehicle;
wherein the beam comprises a single sheet of metal that is formed to include (i) a continuous front wall that extends the length of the beam with a substantially constant height, (ii) top and bottom walls that integrally extend rearward from respective top and bottom portions of the continuous front wall along the length of the beam, and (iii) top and bottom rear walls that, at the center section of the beam, integrally extend downward and upward, respectively, from rear portions of the top and bottom walls;
wherein the top and bottom rear walls each taper in height, as defined by an edge of the sheet of metal, away from a center of the beam toward the ends of the beam;
wherein the beam includes a first cross sectional shape at the end sections of the beam that has a first bending moment and a second cross sectional shape at the center section of the beam that has a second bending moment greater than the first bending moment; and
wherein the beam includes intermediate cross sectional shapes between the first cross sectional shape and the second cross sectional shape having respective intermediate bending moments that increase from the first bending moment to the second bending moment.

8. The bumper reinforcement beam defined in claim 7, wherein, at the end sections of the beam, the rear portions of the top and bottom walls each terminate at an edge of the sheet of metal.

9. The bumper reinforcement beam defined in claim 7, wherein the beam at the first cross sectional shape defines an open channel consisting of the front, top, and bottom walls, and wherein the beam at the second cross sectional shape includes at least one tube comprising the front, top, bottom, top rear, and bottom rear walls.

10. The bumper reinforcement beam defined in claim 7, wherein the mounts are disposed at a rear surface of the front wall between the top and bottom walls.

11. The bumper reinforcement beam defined in claim 7, wherein the top and bottom rear walls are vertically aligned with each other and substantially parallel with the front wall.

12. The bumper reinforcement beam defined in claim 7, wherein the sheet of metal that forms the beam, when laid flat, includes a width between its edges that decreases from the center section of the beam toward the ends of the beam, such that the top and bottom walls at the center section of the beam extend rearward a greater distance than at the ends of the beam.

13. The bumper reinforcement beam defined in claim 7, wherein the beam includes intermediate walls that integrally extend forward from the top and bottom rear walls at the center section and attach to the rear surface of the front wall to define spaced-apart tubes.

14. The bumper reinforcement beam defined in claim 7, wherein the top and bottom rear walls are vertically aligned with each other and substantially parallel with the front wall, and wherein the front wall includes a rearward protruding rib along the length of the beam.

15. A bumper reinforcement beam comprising:
a beam having a length with a longitudinal curve spanning between ends of the beam, the beam comprising a single sheet of metal that is formed to include (i) a continuous front wall that extends the length of the beam with a substantially constant height and (ii) top and bottom walls that integrally extend rearward from respective top and bottom portions of the continuous front wall along the length of the beam, wherein the top and bottom walls at a center section of the beam extend rearward a greater distance than at the ends of the beam;
mounts disposed on a rear surface of the front wall at end sections of the beam, on opposing longitudinal sides of the center section, for engaging a vehicle frame;
wherein, at the end sections of the beam, the rear portions of the top and bottom walls each terminate at an edge of the sheet of metal;
wherein the beam includes a first cross sectional shape at the end sections of the beam that has a first bending moment and a second cross sectional shape at the center section of the beam that has a second bending moment greater than the first bending moment; and
wherein the beam includes intermediate cross sectional shapes between the first cross sectional shape and the second cross sectional shape having respective intermediate bending moments that increase from the first bending moment to the second bending moment.

16. The bumper reinforcement beam defined in claim 15, wherein the beam at the first cross sectional shape defines an open channel consisting of the front, top, and bottom walls.

17. The bumper reinforcement beam defined in claim 16, wherein the beam includes top and bottom rear walls that, at the center section of the beam, integrally extend downward and upward, respectively, from rear portions of the top and bottom walls.

18. The bumper reinforcement beam defined in claim 17, wherein the beam includes intermediate walls that integrally extend forward from the top and bottom rear walls at the center section and attach to a rear surface of the front wall to define spaced-apart tubes.

19. The bumper reinforcement beam defined in claim 18, wherein the sheet of metal that forms the beam, when laid flat, includes a width between its edges that decreases from a center of the beam toward the ends of the beam, such that the top and bottom rear walls each taper in height, as defined by the edge of the sheet of metal, away from the center of the beam toward the end sections of the beam.

20. The bumper reinforcement beam defined in claim 19, wherein the front wall includes a rearward protruding rib along the length of the beam.

\* \* \* \* \*